Nov. 18, 1958 C. W. MILLER 2,861,193
LIGHT SENSITIVE CONTROL CIRCUIT
Filed April 28, 1954
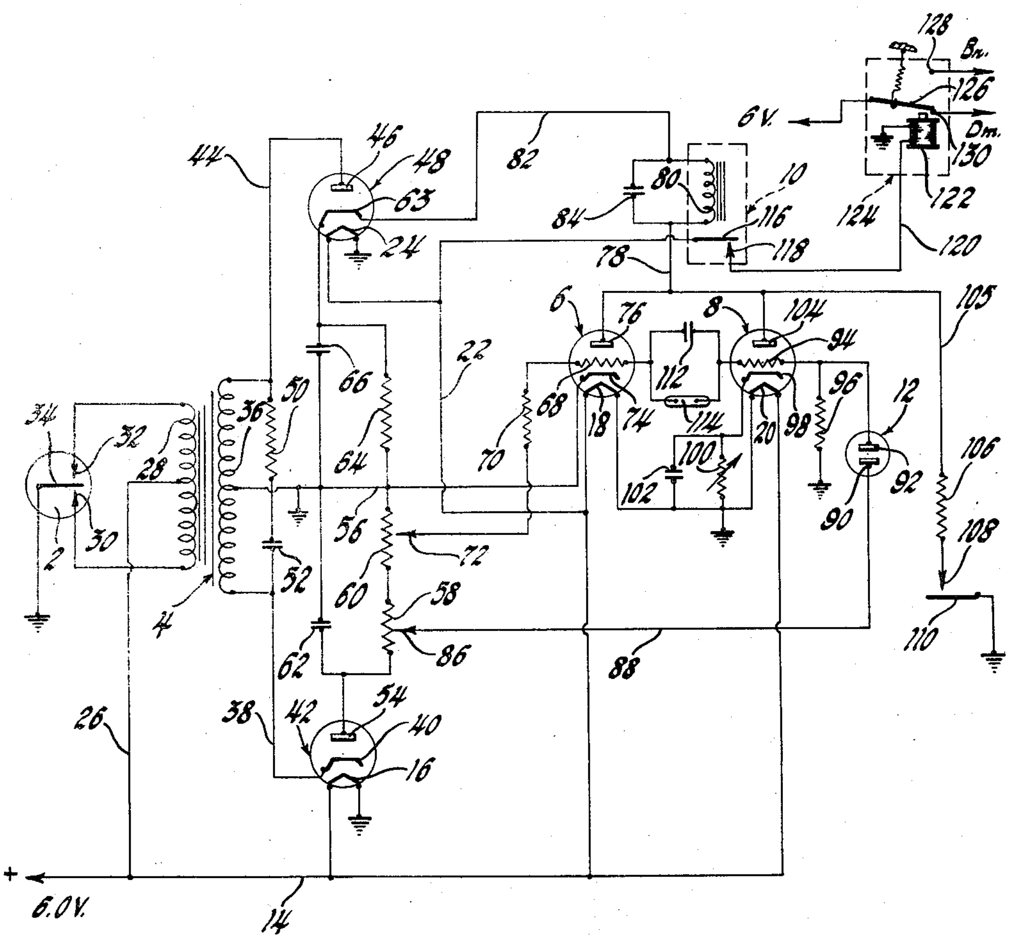
INVENTOR
Charles W. Miller
BY R. E. Fowler
ATTORNEY United States Patent Office 2,861,193

Patented Nov. 18, 1958

2,861,193

LIGHT SENSITIVE CONTROL CIRCUIT

Charles W. Miller, Anderson, Ind., assignor to General Motors Corporation, Detroit, Mich., a corporation of Delaware Application April 28, 1954, Serial No. 426,120

8 Claims. (Cl. 250—214)

This invention relates to light sensitive control systems and more particularly to those for controlling the automatic dimming of multibeam headlamps for automotive vehicles in which light sensitive crystals are used. When light sensitive control systems use a crystal cell as the light sensitive element, the system is a little slow or sluggish in responding to changes in light intensity. Also on a quick light change the crystal may give a surge of control voltage.

It is therefore an object in making this invention to provide a crystal-controlled light sensitive circuit which is quick acting.

It is a further object in making this invention to provide a crystal-controlled light sensitive circuit in which the control voltage is limited to a maximum value.

With these and other objects in view which will become apparent as the specification proceeds, my invention will be best understood by reference to the following specification and claims and the illustrations in the accompanying drawing, in which the figure is a circuit diagram of a light sensitive control system embodying my invention.

Referring now more particularly to the figure, it will be evident that the system consists in general of a high voltage power pack including a vibrator 2 and a transformer 4, a pair of amplifier tubes 6 and 8 connected in parallel and supplied with power by the power pack, a control relay 10 in the output circuit of the amplifiers and a light sensitive cell 12.

The main power line 14 is connected to any suitable source of D. C. power such as the conventional storage battery of an automotive vehicle. Line 14 is connected directly to filaments 16, 18 and 20 and through tie line 22 to filament 24 to provide heating current therefor. The opposite sides of these filaments are all grounded. Tie line 26 is connected to line 14 and to the center tap on primary 28 of transformer 4. The outer terminals of the primary 28 are connected to the stationary contacts 30 and 32 of the vibrator 2. The vibrating armature 34 of the vibrator is grounded. The secondary 36 of the transformer 4 has one terminal connected through line 38 with the cathode 40 of a rectifier tube 42. The other outer terminal of the secondary 36 is connected through line 44 with the anode 46 of a second rectifier tube 48. A resistor 50 in series with a condenser 52 are connected directly across lines 44 and 38 in shunt to the secondary 36. Anode 54 of rectifier tube 42 is connected to the ground line 56 through two resistances 58 and 60 in series. A condenser 62 is connected in shunt to the two resistors 58 and 60. Ground line 56 is also connected to a center tap on secondary 36. Cathode 63 of rectifier tube 48 is connected to ground line 56 through resistor 64 and condenser 66 is connected in shunt to said resistor 64. This much of the system provides the power supply for the amplifier tubes and the photoelectric cell.

The control grid 68 of the first amplifier tube 6 is connected through a dropping resistor 70 to an adjustable tap 72 movable over resistor 60. The cathode 74 of tube 6 is grounded and the anode 76 is connected through line 78 with one terminal of the operating coil 80 of the sensitive relay 10. The opposite side of the operating coil 80 is connected through line 82 with the cathode 63 of the rectifier tube 48. A condenser 84 is connected across the relay coil 80. An adjustable tap 86 on resistor 58 is connected through line 88 to one electrode 90 of the photo-crystal 12, the other electrode 92 being connected directly to control grid 94 of the amplifier tube 8. Grid 94 is also connected to ground through resistor 96. The cathode 98 of amplifier tube 8 is connected to ground through an adjustable resistance 100 shunted by a condenser 102. The anode 104 of the tube 8 is also connected to line 78 so that the two amplifier tubes 6 and 8 in parallel control the energization of the relay coil 80.

Line 105, connected to line 78, extends to a resistance 106, the opposite terminal of which is connected to stationary switch contact 108 which is adapted to be engaged by a movable switch arm 110, which is grounded to form an overriding control. The two control grids 68 and 94 are connected together by a condenser 112 which is shunted by a gas neon tube 114 to discharge the condenser when its potential has reached a predetermined value. The discharge of this condenser provides quick action of the tubes. Tie line 22 from the 6-volt source extends to the movable armature 116 of the relay 10, which armature is adapted to engage a stationary contact 118 when the relay coil 80 is not energized. Contact 118 is connected through line 120 to energizing coil 122 of a power relay 124, the opposite terminal of which is grounded. The armature 126 of the relay 124 is connected to the 6-volt source and adapted to move between two stationary contacts 128 and 130 connected to the bright and dim filaments respectively, as indicated. A spring bias normally holds the armature 126 in engagement with the contact 128 to maintain the bright filaments energized and when the relay coil 122 is energized the armature is moved into engagement with contact 130 to energize the dim filaments.

In the operation of the system, as previously mentioned, the two amplifier tubes 6 and 8 are in parallel and the conductance through both provides energizing current for the control relay 10. The left-hand amplifier 6 may be called the helping section, the right-hand tube 8 being controlled entirely by the photoelectric cell or crystal 12. The point at which amplifier 6 conducts may be adjusted by moving movable contact 72 over resistor 60 to give the proper bias, and it is so adjusted as to provide a certain flow with no light on the photocell. The bias of the amplifier 8 is adjusted through movement of the variable contact 86 on resistor 58. When both biases have been properly adjusted with the cell 12 blacked out, the system is ready for operation.

When light falls on the photocell 12 from some source of light such as the approaching headlights of a vehicle, the voltage developed across resistor 96 causes tube 8 to begin to cut off or reduce conductivity. As light increases on the cell, grid 68 of the helping tube 6 will also tend to cut off in the same manner because of the coupling condenser 112 between the two grids. As light continues to increase on the photocell, tube 8 will reach a point of cut-off condition and a surge will be introduced into the grid 68 of tube 6 through condenser 112. This surge is a negative one and will cause the tube 6 to quickly reduce its conductivity, releasing the relay armature 116 which moves into contact with its stationary contact 118. This completes an obvious energizing circuit for relay coil 122, which attracts its armature 126, moving it into engagement with stationary contact 130 to break the energizing circuit to the bright filaments and to complete an energizing circuit for the dim filaments. As light continues to fall on the cell due to the cars approaching, the voltage drop across resistance 96 will become greater and greater until the voltage built up across condenser 112 will be sufficiently high to cause the neon tube 114 connected thereacross to fire. The condenser 112 will discharge through the neon tube and the cycle of charging the condenser 112 will be repeated. The conductivity of the tubes, however, will be held sufficiently low during this time to maintain the coil 80 deenergized and the lights will remain on dim position.

As the cars pass, the light impressed on the cell 12 is suddenly removed. This causes the voltage across resistor 96 to change suddenly from a high negative voltage to a low negative voltage. This sudden change is in the positive direction and will thus cause the helping section or tube 6 to draw a high amount of current quickly, thus energizing coil 80 and opening switch 116, 118. Due to the bias on grid 68 the current through relay coil 80 will not fall below a predetermined amount after the initial change and relay 10 will remain closed. The voltage across resistor 96 will gradually leak off through the cell and tube 8 will return to its proper conductive condition to maintain the relay coil 80 energized. The neon tube 114 connected across condenser 112 limits the voltage drop across the resistor 96 by periodically discharging when the voltage has reached a predetermined point and then being recharged cyclically. Another purpose of the neon bulb is to prevent return to upper beam illumination whenever the light is reduced even though another car following the first provides a certain amount of illumination. By limiting the voltage on grid 94, which is developed across resistance 96, the surge caused by the change from light to no-light condition is reduced and the condition of returning to high beam, if a specified amount of light remains, is prevented.

It will thus be seen that the use of two triode amplifiers in parallel interconnected by the coupling condenser 112 provides a very rapid action to give a quick actuation of the control relay 80 where the normal operation of the photoelectric cell is relatively slow. This circuit also accommodates itself to take care of the surge in voltage produced by a change from light toward no-light condition.

This system is also provided with an override control through line 105, resistance 106, and switch 110, 108. When this switch is manually closed, an obvious circuit is provided through this switch to ground to maintain the relay coil 80 energized and the lights will, therefore, remain on high beam regardless of what happens to the conductance through tubes 6 and 8.

I claim:

1. In a control system, a light sensitive cell, a plurality of electronic amplifiers each having a control grid and plate, a source of electrical power, circuit controlling means connected to said source and to the plates of said amplifiers, the latter being connected in parallel relation so that the combined flow through the amplifiers controls the circuit controlling means, said cell being directly connected to one of the grids to control the potential thereof, and impedance means interconnecting the grids so that voltage changes on one will be transferred to another in timed relation.

2. In a control system, a light sensitive cell, a plurality of electronic amplifiers each having a control grid and plate, a source of electrical power, circuit controlling means connected to said source and to the plates of said amplifiers, the latter being connected in parallel relation so that the combined flow through the amplifiers controls the circuit controlling means, said cell being connected to only one of the grids, and a condenser connected between the grids of the amplifiers to transmit the voltage on one to another.

3. In a control system, a light sensitive cell, a plurality of electronic amplifiers each having a control grid and plate, a source of electrical power, circuit controlling means connected to said source and to the plates of said amplifiers, the latter being connected in parallel relation so that the combined flow through the amplifiers controls the circuit controlling means, said cell being connected to one of the grids, a condenser connected between the grids of the amplifiers to transmit the voltage on one to another, and a gas filled tube connected in shunt across the condenser designed to conduct when a critical voltage is reached to discharge the condenser.

4. In a light controlled system, the combination of a source of electrical power, a circuit controlling device connected to said source, a pair of electron discharge tubes connected in parallel between the device and ground, control grids in each tube, a light sensitive cell connected to the source and to one of the grids, a resistor connected between the one grid and ground and across which voltage is developed by flow through said cell, and means interconnecting the grids so that voltage changes on the one grid will be reflected to the other and the combined flow through both tubes will control the circuit controlling device.

5. In a light controlled system, the combination of a source of electrical power, a circuit controlling device connected to said source, a pair of electron discharge tubes connected in parallel between the device and ground, control grids in each tube, a light sensitive cell connected to the source and to one of the grids, a resistor connected between the one grid and ground and across which voltage is developed by flow through said cell, means interconnecting the grids so that voltage changes on the one grid will be reflected to the other and the combined flow through both tubes will control the circuit controlling device, and means for independently adjusting the bias on said grids.

6. In a light controlled system, the combination of a source of electrical power, a circuit controlling device connected to said source, a pair of electron discharge tubes connected in parallel between the device and ground, control grids in each tube, adjustable means connecting each grid to the source of power to adjust the bias thereon, a light sensitive cell included in a first tube grid connecting means, a grid resistance connected between said first grid and ground across which a variable control voltage is developed by changes in the amount of light falling on said cell, and means interconnecting said grids so that changes in the voltage on one will be transferred to the other.

7. In a light controlled system, the combination of a source of electrical power, a circuit controlling device connected to said source, a pair of electron discharge tubes connected in parallel between the device and ground, control grids in each tube, adjustable means connecting each grid to the source of power to adjust the bias thereon, a light sensitive cell included in a first tube grid connecting means, a grid resistance connected between said first grid and ground across which a variable control voltage is developed by changes in the amount of light falling on said cell, means interconnecting said grids so that changes in the voltage on one will be transferred to the other, and further adjustable means connected to said first tube to adjust the bias on said tube.

8. In a light controlled system, the combination of a source of electrical power, a circuit controlling device connected to said source, a pair of electron discharge tubes connected in parallel between the device and ground, control grids in each tube, adjustable means connecting each grid to the source of power to adjust the bias thereon, a light sensitive cell included in a first tube grid connecting means, a grid resistance connected between said first grid and ground across which a variable control voltage is developed by changes in the amount of light falling on said cell, a condenser and a gas tube in parallel therewith connected between the grids to transmit the voltage of one to the other.

References Cited in the file of this patent

UNITED STATES PATENTS

| | | |
|---|---|---|
| 2,558,969 | LeCroy | July 3, 1951 |
| 2,582,676 | Bordewieck et al. | Jan. 15, 1952 |
| 2,598,420 | Onksen | May 27, 1952 |
| 2,718,612 | Willis | Sept. 20, 1955 |